United States Patent [19]

Butler

[11] Patent Number: 5,707,239

[45] Date of Patent: Jan. 13, 1998

[54] METHOD FOR PLAYING A MULTIPURPOSE MATH FUNCTION LEARNING GAME

[76] Inventor: Sally L. Butler, 28120 Kanis Rd., Ferndale, Ark. 72122

[21] Appl. No.: 572,038

[22] Filed: Dec. 14, 1995

[51] Int. Cl.[6] ............................................. G09B 19/02
[52] U.S. Cl. ........................... 434/191; 434/209; 434/128; 273/249
[58] Field of Search ........................ 434/110, 188, 434/191, 209, 128; 273/236, 242, 243, 248, 249, 146

[56] References Cited

U.S. PATENT DOCUMENTS

| | | | |
|---|---|---|---|
| 3,104,106 | 9/1963 | Kenney et al. | 434/191 X |
| 3,939,578 | 2/1976 | Coffey | 434/347 |
| 4,061,335 | 12/1977 | Breslow | 273/243 |
| 4,109,918 | 8/1978 | Mele et al. | 273/243 X |
| 4,346,897 | 8/1982 | Sisak | 273/292 X |
| 4,953,874 | 9/1990 | Golomb | 434/191 X |
| 5,083,793 | 1/1992 | Sanford | 434/207 X |
| 5,102,339 | 4/1992 | Parriera | 434/191 |
| 5,167,503 | 12/1992 | Jordon | 434/128 |
| 5,318,447 | 6/1994 | Mooney | 434/209 X |

Primary Examiner—Jeffrey A. Smith

[57] ABSTRACT

A multipurpose math function learning game comprised of a plurality of games utilizing math functions such as addition, subtraction, and multiplication to achieve a desired objective of winning one of the plurality of games.

1 Claim, 2 Drawing Sheets

METHOD FOR PLAYING A MULTIPURPOSE MATH FUNCTION LEARNING GAME

BACKGROUND OF THE INVENTION

1. Field of the Invention

The present invention relates to an multipurpose math function learning game and more particularly pertains to encouraging practice in addition, subtraction, and multiplication by school age children with an multipurpose math function learning game.

2. Description of the Prior Art

The use of educational board games is known in the prior art. More specifically, educational board games heretofore devised and utilized for the purpose of teaching children fundamentals are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,149,102 to McGowan et al. discloses an apparatus and method of playing a math game.

U.S. Pat. No. 5,058,896 to Bez discloses a board game.

U.S. Pat. No. 4,946,170 to Mastro discloses a multi-use board game.

U.S. Pat. No. 4,541,635 to Shoptaugh discloses a board game structure.

U.S. Pat. No. 3,709,498 to Liston discloses a board game apparatus comprising play programming means.

U.S. Pat. No. 4,915,392 to Swartz discloses a board game.

While these devices fulfill their respective, particular objective and requirements, the aforementioned patents do not describe an multipurpose math function learning game for encouraging practice in addition, subtraction, and multiplication by school age children.

In this respect, the multipurpose math function learning game according to the present invention substantially departs from the conventional concepts and designs of the prior art, and in doing so provides an apparatus primarily developed for the purpose of encouraging practice in addition, subtraction, and multiplication by school age children.

Therefore, it can be appreciated that there exists a continuing need for new and improved multipurpose math function learning game which can be used for encouraging practice in addition, subtraction, and multiplication by school age children. In this regard, the present invention substantially fulfills this need.

SUMMARY OF THE INVENTION

In the view of the foregoing disadvantages inherent in the known types of educational board games now present in the prior art, the present invention provides an improved multipurpose math function learning game. As such, the general purpose of the present invention, which will be described subsequently in greater detail, is to provide a new and improved multipurpose math function learning game and method which has all the advantages of the prior art and none of the disadvantages.

To attain this, the present invention essentially comprises a first game comprising a game board. The game board has a plurality of spaces thereon defining a path of travel. The plurality of spaces have a starting point and an ending point. The first game has a plurality of game pieces adapted for travel around the plurality of spaces. The first game has a pair of dice. A first die has numbers two through seven thereon. A second die has numbers four through nine thereon. The pair of dice determine the plurality of game pieces path of travel around the plurality of spaces.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multipurpose math function learning game which has all the advantages of the prior art educational board games and none of the disadvantages.

It is another object of the present invention to provide a new and improved multipurpose math function learning game which may be easily and efficiently manufactured and marketed.

It is a further object of the present invention to provide a new and improved multipurpose math function learning game which is of durable and reliable construction.

An even further object of the present invention is to provide a new and improved multipurpose math function learning game which is susceptible of a low cost of manufacture with regard to both materials and labor, and which accordingly is then susceptible of low prices of sale to the consuming public, thereby making such an multipurpose math function learning game economically available to the buying public.

Still yet another object of the present invention is to provide a new and improved multipurpose math function learning game which provides in the apparatuses and methods of the prior art some of the advantages thereof, while simultaneously overcoming some of the disadvantages normally associated therewith.

Even still another object of the present invention is to provide a new and improved multipurpose math function learning game for encouraging practice in addition, subtraction, and multiplication by school age children.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
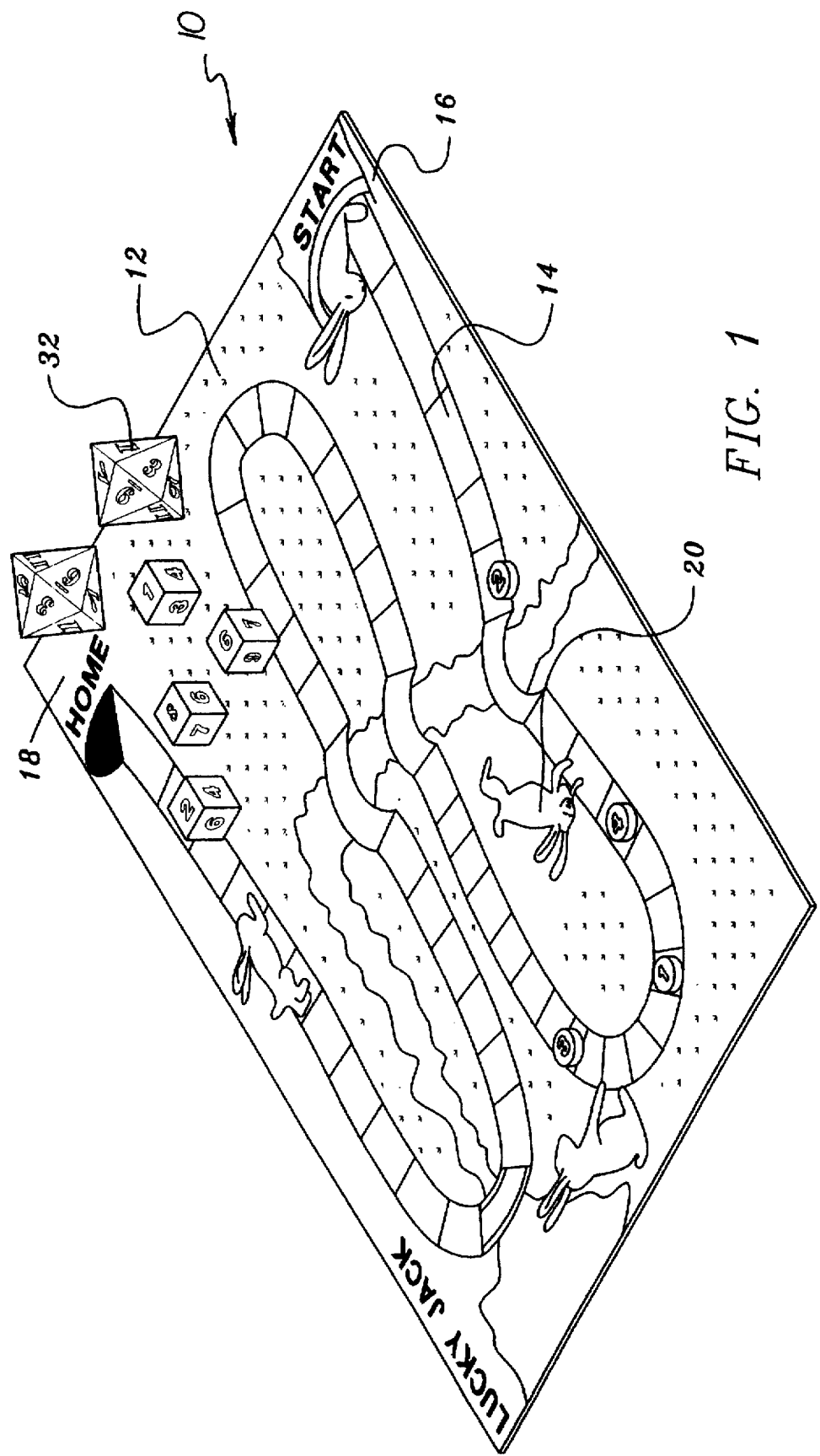
FIG. 1 is a perspective view of the preferred embodiment of the multipurpose math function learning game constructed in accordance with the principles of the present invention.
Figure 2:
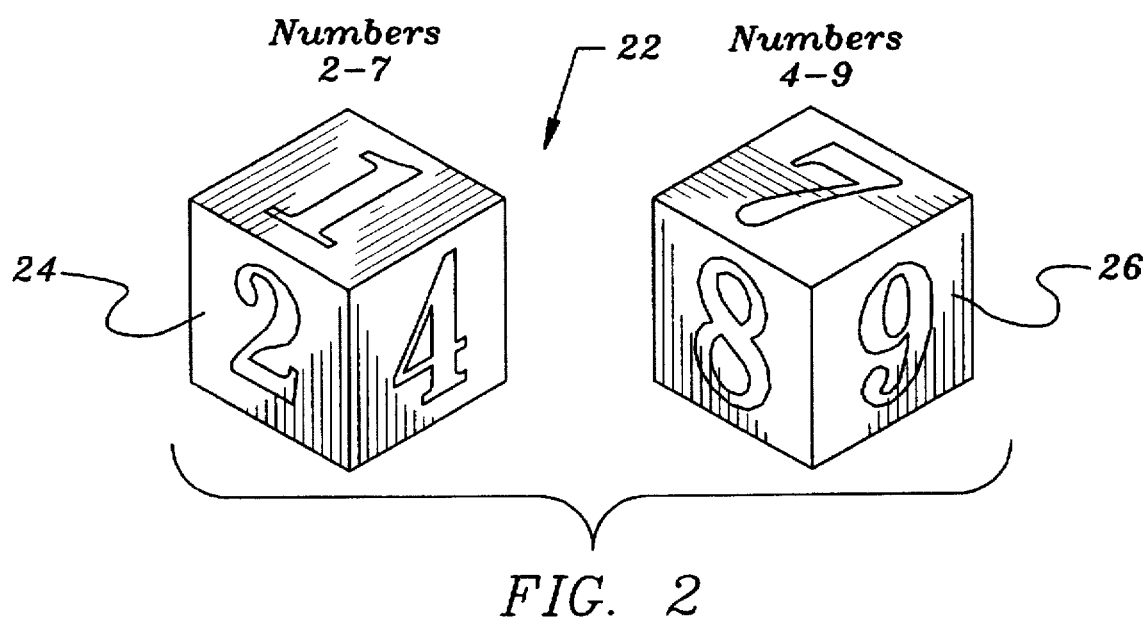
FIG. 2 is a perspective view of the set of dice of the first game of the present invention.

With reference now to the drawings, and in particular, to Figures thereof, the preferred embodiment of the new and improved multipurpose math function learning game embodying the principles and concepts of the present invention and generally designated by the reference number 10 will be described.

Specifically, it will be noted in the various Figures that the device relates to a new and improved multipurpose math function learning game for encouraging practice in addition, subtraction, and multiplication by school age children. In its broadest context, the device consists of a first game and a second game. Such components are individually configured and correlated with respect to each other so as to attain the desired objective.

The device 10 includes a first game comprised of a game board 12. The game board 12 has a plurality of spaces 14 thereon defining a path of travel. The plurality of spaces 14 have a starting point 16 and an ending point 18. The starting point 16 is positioned at the beginning of the plurality of spaces 14 to designate a starting position for players. The ending point 18 is positioned at the end of the plurality of spaces 14 to designate a finishing point for players. The first game has a plurality of game pieces 20 adapted for travel around the plurality of spaces 14. The preferred design of the game pieces 20 is in the shape of rabbits. The first game has a pair of dice 22. A first die 24 has numbers two through seven thereon. A second die 26 has numbers four through nine thereon. The pair of dice 22 determine the plurality of game pieces 20 path of travel around the plurality of spaces 14. The first game is a math game designed to encourage practice in addition and subtraction or multiplication and subtraction as well as the concepts of greater and lesser numbers for school-age children. The game board 12 depicts a rabbit path of many segments with pitfalls on which the rabbits must travel from the starting point 16 to the ending point 18. The first game also includes six playing pieces 20, and the two sets of numbered dice 22. The game is played by two to six players. After deciding which set of dice is to be used, as well as whether to use addition or multiplication, each player rolls the dice in turn and adds or multiplies the two numbers rolled. The player rolling the highest sum or product is the only player able to move that turn. He can only move by the amount of the difference between his score and that of his nearest opponent. No one else moves that turn. In case of a tie they all roll again. The game continues until a winner reaches the ending point 18.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A method for playing a math function learning game comprising the steps of:

providing a math function learning game, the game comprising a game board, the game board having a plurality of spaces thereon defining a path of travel, the plurality of spaces having a starting point and an ending point, a plurality of game pieces adapted for travel around the plurality of spaces, having a pair of dice, a first die having numbers two through seven thereon, a second die having numbers four through nine thereon, the pair of dice determining the plurality of game pieces path of travel around the plurality of spaces;

rolling the dice during each turn, wherein each player rolls the dice;

adding the numbers depicted during each roll of the dice during each turn;

moving one of the game pieces an amount of spaces on the game board corresponding to the difference between a greatest sum of the previous step and a second to greatest sum of the previous step, wherein a game piece of a player who rolls the greatest sum during the turn is the only game piece that moves during the turn; and rolling the dice a second time when a tie occurs.

* * * * *